United States Patent
Neumann et al.

(10) Patent No.: US 11,416,019 B2
(45) Date of Patent: Aug. 16, 2022

(54) DOUBLE PEDAL SYSTEM FOR AN INDUSTRIAL TRUCK

(71) Applicant: Jungheinrich Aktiengesellschaft, Hamburg (DE)

(72) Inventors: Gunnar Neumann, Hanburg (DE); Mario Eden, Kaltenkirchen (DE); Sven Freygang, Kaltenkirchen (DE)

(73) Assignee: JUNGHEINRICH AKTIENGESELLSCHAFT, Hamburg (DE)

(*) Notice: Subject to any disclaimer, the term of this patent is extended or adjusted under 35 U.S.C. 154(b) by 0 days.

(21) Appl. No.: 17/153,574

(22) Filed: Jan. 20, 2021

(65) Prior Publication Data
US 2021/0223813 A1 Jul. 22, 2021

(30) Foreign Application Priority Data
Jan. 21, 2020 (DE) .................. 10 2020 200 633.4

(51) Int. Cl.
*G05G 1/30* (2008.04)
*B60K 26/02* (2006.01)
(Continued)

(52) U.S. Cl.
CPC .............. *G05G 1/34* (2013.01); *B60K 26/02* (2013.01); *G05G 1/36* (2013.01); *G05G 1/38* (2013.01);
(Continued)

(58) Field of Classification Search
CPC .. G05G 1/34; G05G 1/36; G05G 1/38; G05G 1/44; G05G 5/05; B60K 20/02; B60K 26/00; B66F 9/0759
See application file for complete search history.

(56) References Cited

U.S. PATENT DOCUMENTS

| | | | |
|---|---|---|---|
| 7,921,763 B2* | 4/2011 | Anderson | B60T 7/042 91/376 R |
| 8,005,588 B2* | 8/2011 | Dower | B60W 10/10 701/22 |

(Continued)

FOREIGN PATENT DOCUMENTS

| | | |
|---|---|---|
| DE | 102007040541 A1 | 3/2009 |
| EP | 1216876 A2 | 6/2002 |

(Continued)

OTHER PUBLICATIONS

European Application No. EP21151286.8, Extended European Search Report, dated Jun. 22, 2021, 6 pages.

(Continued)

*Primary Examiner* — Adam D Rogers
(74) *Attorney, Agent, or Firm* — Kilpatrick Townsend & Stockton LLP

(57) ABSTRACT

A double pedal system for an industrial truck, comprising a first spring-reset pedal, a second spring-reset pedal. The first and the second spring-reset pedals are provided so as to be mechanically independent of one another, and are each provided with a device for electronically capturing the current actuation path of the corresponding pedal. A control unit is operatively coupled to the devices for electronically capturing the actuation paths of the two pedals, and is designed to determine a travel target value from the current actuation paths of the two pedals. The invention furthermore relates to an industrial truck comprising a double pedal system of this kind, and to a method for operating the double pedal system.

10 Claims, 3 Drawing Sheets

(51) Int. Cl.
 *G05G 1/34* (2008.04)
 *G05G 1/36* (2008.04)
 *G05G 1/38* (2008.04)
 *G05G 1/44* (2008.04)
 *B66F 9/075* (2006.01)
 *G05G 5/05* (2006.01)

(52) U.S. Cl.
 CPC .............. *G05G 1/44* (2013.01); *B66F 9/0759* (2013.01); *G05G 5/05* (2013.01)

(56) References Cited

U.S. PATENT DOCUMENTS

| | | | | |
|---|---|---|---|---|
| 8,469,138 | B1* | 6/2013 | Koehler | B60K 26/02 |
| | | | | 180/315 |
| 2002/0082138 | A1* | 6/2002 | Cannon | B60K 26/00 |
| | | | | 477/115 |
| 2005/0103555 | A1* | 5/2005 | Cannon | B60K 26/00 |
| | | | | 180/336 |

FOREIGN PATENT DOCUMENTS

| | | | | |
|---|---|---|---|---|
| EP | 2818444 A1 | * | 12/2014 | ............ B60T 7/042 |
| WO | 2008054587 A1 | | 5/2008 | |
| WO | 2009154552 A1 | | 12/2009 | |

OTHER PUBLICATIONS

German Application No. 102020200633.4, "Search Report", dated May 22, 2020, 8 pages.
ISO—ISO 3691-1:2011—Industrial trucks—Safety requirements and verification—Part 1: Self-propelled industrial trucks, other than driverless trucks, variable-reach trucks and burden-carrier trucks, Abstract only, 3 pages.
EN 1175:2020—Safety of industrial trucks—Electrical/electronic requirements (iteh.ai), Abstract only, 1 page.
ISO—ISO 21281:2005—Construction and layout of pedals of self-propelled sit-down rider-controlled industrial trucks—Rules for the construction and layout of pedals, Abstract only, 3 pages.
PREN 1175: Draft 2017 Safety of Industrial Trucks—Electrical/E (saiglobal.com), Abstract only, 2 pages.

* cited by examiner

DOUBLE PEDAL SYSTEM FOR AN INDUSTRIAL TRUCK

CROSS-REFERENCE TO RELATED APPLICATION

This application claims priority to German Patent Application No. 10 2020 200 633.4, filed in Germany on Jan. 21, 2020, the entire contents of which are hereby incorporated herein by this reference.

BACKGROUND

In addition to systems, likewise known, having merely an accelerator pedal and a travel direction switch, double pedals are an essential control concept for the travel drive of industrial trucks in the prior art. In particular in the case of counterbalance forklifts, double pedals of this kind are used, by means of which a driver of the industrial truck directs the forwards and backwards travel of the industrial truck using two pedals.

In this case, on the one hand a system is known in which the two pedals are located at the ends of a rocker, such that one of the two pedals moves up when the other is actuated downwards, and on the other hand, for example from DE 10 2007 040 541 A1, a system is known in which two pedals are coupled to one another by means of a transmission, such that in each case just one of the pedals can be pressed down, and the two pedal levers are in each case pre-loaded into a neutral position.

Even if pedal designs of this kind have become widespread in the market, they are nonetheless considered, by users, to be relatively stiff and not particularly ergonomic. However, it is still desirable for the essential actuation technology for such a system, which is established on the market and among users, to be maintained, in order to be able to avoid laborious training and re-education processes for the drivers of corresponding industrial trucks.

DETAILED DESCRIPTION

Figure 1:
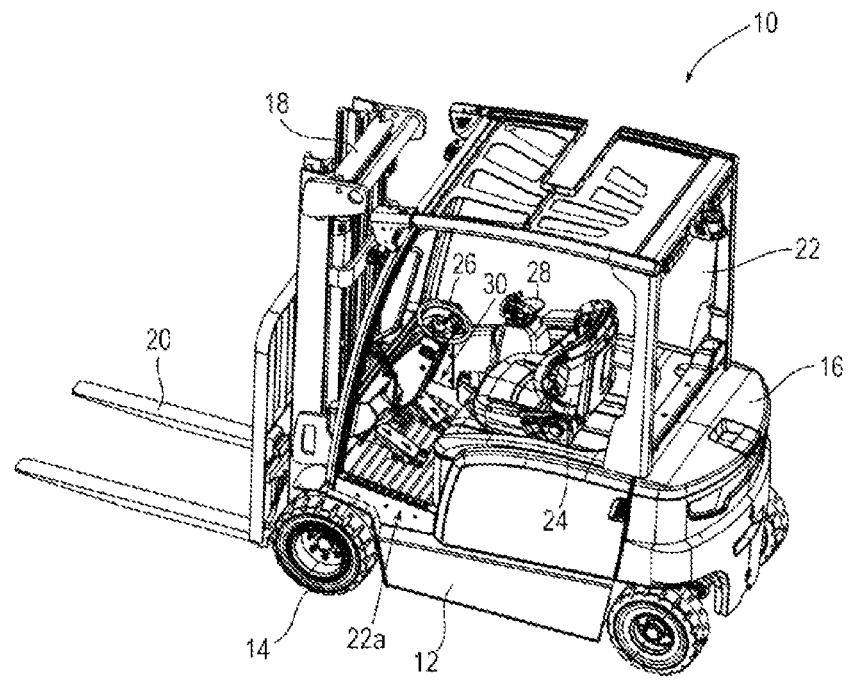
FIG. 1 is an isometric view of an industrial truck according to the invention.

Furthermore, it is desirable to develop an improved system which is relatively similar, in terms of the mechanical components and dimensions thereof, to the already established double pedal systems, in order to be able to offer simple retrofitting or a new variant having an improved double pedal system, with only minor structural amendments, in existing model ranges of industrial trucks.

The present invention relates to a double pedal system for an industrial truck, comprising a first and a second spring-reset pedal, and to an industrial truck which comprises a double pedal system of this kind, and to a method for operating a double pedal system of this kind.

In order to achieve this object, in the double pedal system according to the invention the first and the second spring-reset pedals are provided so as to be mechanically independent of one another, and are each provided with a device for electronically capturing the current actuation path of the corresponding pedal, the double pedal system further comprising a control unit which is operatively coupled to the devices for electronically capturing the actuation paths of the two pedals, and is designed to determine a travel target value from the current actuation paths of the two pedals.

It is thus to the credit of the inventors of the present invention to have identified that mechanical coupling of the two pedals by a rocker or a complex mechanical coupling system can be omitted, and the calculation of the travel target value can be performed merely by a control unit on the basis of the respective current actuation paths of the two pedals. In this connection, it should be noted that the innovation according to the invention complies with all relevant standards for industrial trucks, in particular ISO 3691-1, EN 1175-1, the expected reform prEN 1175, and ISO 21281 for pedals in power-operated industrial trucks having a driver's seat. Although, in particular in the latter standard, the geometry for the arrangement of the pedals is specified, as well as the fact that pressing down a pedal must increase the travel speed, in the case of a change in the direction of travel in a moving industrial truck the travel speed can be reduced. This requirement thus also allows braking using the second pedal, as can be performed by the control unit in the double pedal system according to the invention, in the event of the travel target value being determined from the two current actuation paths.

In this case it is possible in particular for the control unit to be designed to determine the travel target value by calculating the difference between the two current actuation paths of the pedals. Even if this difference calculation may furthermore also comprise progressive parameters dependent on the current actuation path or any desired weighting between the two actuation paths of the pedals, in the simplest case it is possible for an unweighted difference to be formed between the two actuation paths, and the value calculated in this manner can be scaled on a travel target value. In this case and in the following, the term of the travel target value is to be understood such that the control unit outputs the travel target value, determined in the manner just described, at a drive source of the industrial truck, and the drive power is set on the basis of this travel target value. In this case, a larger travel target value generally corresponds to a greater output power of the drive source, which in turn corresponds to a greater actuation path of merely one of the two pedals.

Since the corresponding industrial trucks should generally be capable of travelling both forwards and backwards, in a similar manner, the control unit can furthermore be designed to determine a travel target direction, depending on the current actuation paths of the two pedals, during the determination of the travel target value. In particular, in this case it is possible for one of the two pedals to be associated with a forward movement, and the other to be associated with a backwards movement. In this case, in the manner described above in each case a larger current actuation path of the corresponding pedal corresponds to a greater travel target value and thus a greater power output of the drive source in the direction in question.

If, hitherto, it is assumed that, at any desired timepoint, in each case just one of the two pedals is actuated, and thus has a positive current actuation path, the corresponding state can thus be considered to be substantially still comparable with the examples described above having pedals that are coupled together mechanically, since here in each case merely actuation of a single pedal by a corresponding counter movement of the other pedal is possible. Since, in contrast thereto, in the system according to the invention states are nonetheless now also possible in which both pedals have a positive current movement path, a further type of operation can be defined for such a state, since ultimately an additional degree of freedom has been provided for the input of instructions for the driver, in that said driver can actuate the two pedals in a manner mechanically independently of one another.

For example, the control unit can accordingly be designed to order a process for reducing the speed value of the industrial truck in the event of both pedals being deflected simultaneously, i.e. in the event of a positive current actuation path of both pedals. In this manner, in addition to the mentioned calculation of the difference between the two current actuation paths for determining a travel target value for instructing a drive source, a further parameter can also be derived from the actuation of the two pedals, for example an instruction value for a braking device of the industrial truck that is independent of the drive source. Alternatively, upon identification of simultaneous actuation of the two pedals, it could also be possible for the drive source to be taken out of operation immediately, and for merely a braking process to be performed, the intensity of which can again be derived from the current actuation paths of the two pedals, for example full braking in the case of both pedals being fully slammed on at the same time, and corresponding scaled-down braking in the case of a smaller actuation path of the two pedals.

As already indicated, in a second aspect the present invention related to an industrial truck, in particular an electrically operated industrial truck, comprising a driver's seat and a double pedal system according to the invention that is attached in a footwell in front of the driver's seat, wherein the control unit of the double pedal system is operatively coupled to, or integrated with, a controller of a drive motor of the industrial truck. In this case, various configurations are conceivable, with respect to how the control unit of the double pedal system and the controller of the drive motor could behave with respect to one another. For example, a single central control device of the industrial truck can both take on the tasks of the control unit of the double pedal system, i.e. in particular the determination of the travel target value from the current actuation paths of the two pedals, and the typical tasks of a controller of the drive motor of the industrial truck, while in another embodiment the control unit of the double pedal system can be designed for example as a relatively low-power integrated microprocessor circuit which merely takes on, in real time, the processing of the two actuation paths of the pedals to form a travel target value, and the subsequent forwarding thereof to a separately designed controller of the drive motor.

Since the two pedals of the double pedal system according to the invention, in the industrial truck discussed, should in general be actuated by both feet of the driver of the industrial truck, it is expediently possible for the first of the two pedals to be provided on the right-hand side with respect to a longitudinal central axis of the driver's seat, and the second of the two pedals to be provided on the left-hand side with respect to a longitudinal central axis of the driver's seat. In this case, the driver's seat itself can be offset, in a width direction, with respect to the central axis, in a longitudinal direction of the industrial truck.

In order to yet further improve the anatomical suitability of this arrangement of the two pedals, they can be arranged obliquely with respect to the longitudinal central axis of the driver's seat, such that they also extend away from the longitudinal central axis, in the direction away from the driver's seat. Thus, the two pedals open an angle between one another, viewed from the driver's seat, which can be selected in an ergonomically optimal manner, on the basis of further structural parameters of the industrial truck.

Furthermore, the industrial truck can comprise a device for inductive braking, the control unit of the double pedal system and the device for inductive braking interacting such that, in the event of both pedals being deflected simultaneously, the device for inductive braking is actuated.

According to a third aspect, the present invention relates to a method for operating a double pedal system according to the invention, said method comprising the steps of capturing the current actuation paths of the two pedals, and determining a travel target value from the current actuation paths of the two pedals.

Furthermore, in the manner already indicated above, during determination of the travel target value from the current actuation paths of the two pedals the method according to the invention can further comprise determining a travel target direction.

As also already indicated, the determination of the travel target value can comprise calculating a difference between the two current actuation paths of the pedals and scaling the calculated difference with respect to a maximally available drive power of the industrial truck.

Further features and advantages of the present invention will become clear from the following description of an embodiment thereof, considered in conjunction with the accompanying drawings. In the drawings, in detail:

FIG. 1 firstly shows an industrial truck according to the invention in an isometric view, which truck is denoted very generally by reference sign 10. Said industrial truck 10 is designed as a counterweight forklift and comprises conventional components such as a vehicle body 12, wheels 14, a counterweight 16 which receives, in the inside, components not shown in FIG. 1 such as a drive motor, a steering mechanism, hydraulic components, a control device, and optionally an accumulator, a lifting platform 18 comprising a load receiving means 20 in the form of a fork which can be displaced thereon in the vertical direction, and a driver's cab 22.

In turn, a driver's seat 24 is provided in the driver's cab 22, on which seat a driver of the industrial truck 10 sits during operation, and from where he can actuate various operating elements using his hands and feet. These operating elements comprise a steering wheel 26 and a pilot 28 which can be operated by the driver of the industrial truck 10, using his left or right hand, in order to steer the industrial truck 10 or to operate hydraulic components, such as the lifting function of the lifting platform 18.

Figure 2A:
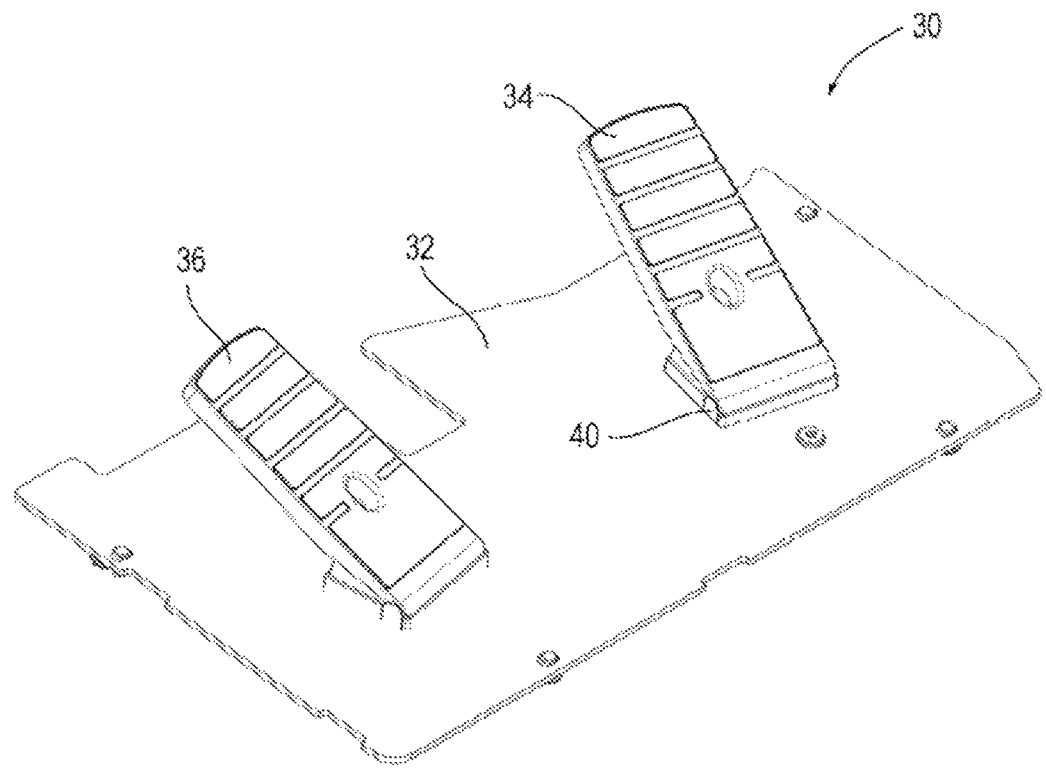
FIGS. 2*a* and 2*b* are an isometric view and a view from below of the double pedal system of the industrial truck from FIG. 1.
Figure 2B:
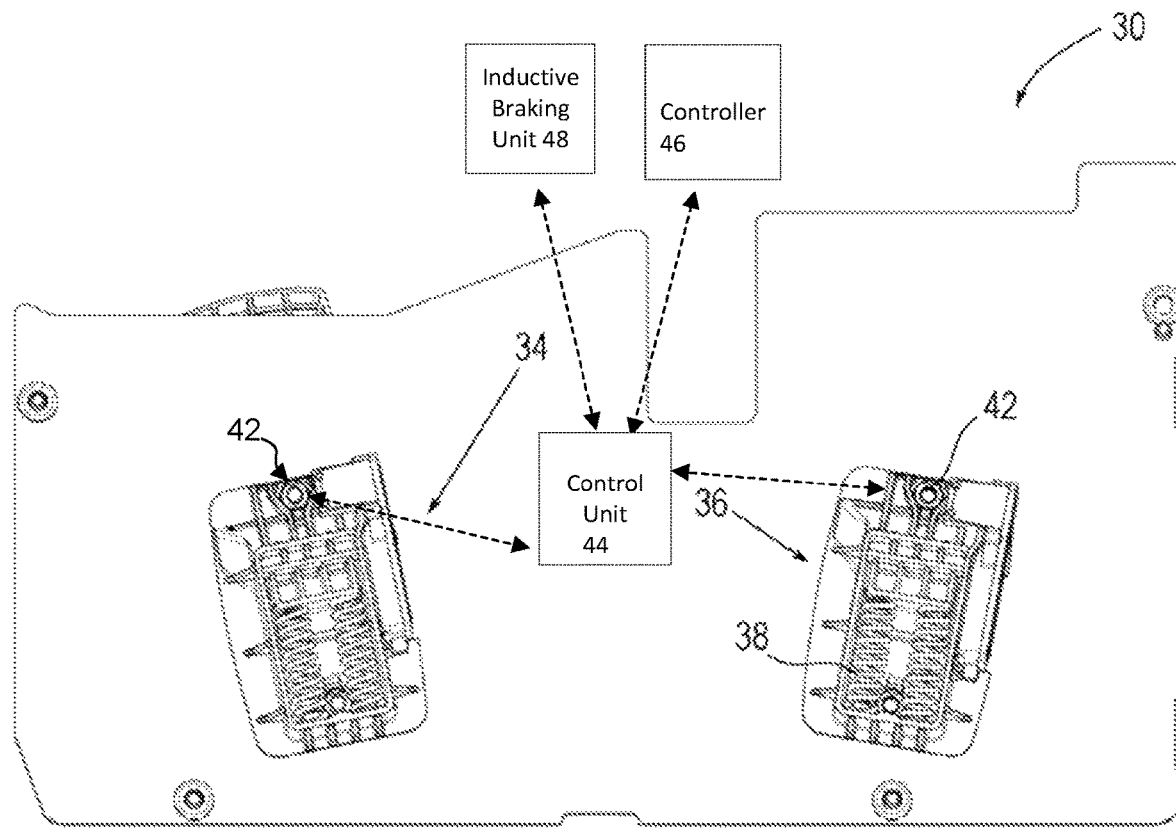

Furthermore, a double pedal system 30 according to the invention is located in the footwell 22a in front of the driver's seat 24, which system will be described in greater detail in the following, with reference to FIGS. 2a and 2b. In this case, FIG. 2a shows the double pedal system 30 in a isometric plan view, a right-hand 34 and a left-hand 36 pedal being hinged to a base plate 32 in such a way that they extend, in each case, obliquely outwards with respect to the longitudinal central axis of the driver's seat 24, in the direction away from the driver's seat 24, in order to thereby be able to ensure an optimal anatomical position for the driver of the industrial truck 10.

It can be seen both from the isometric view in FIG. 2a and from the view from below in FIG. 2b that there is no mechanical coupling provided between the two pedals 34 and 36, and therefore said pedals 34 and 36 can be actuated in a manner completely independently of one another. In particular, the two pedals 34 and 36 are designed so as to be substantially structurally identical, and preloaded in the direction of an upper end position by means of respective spiral springs 38, which end position corresponds to a current actuation path of zero.

The driver of the industrial truck 10 can now exert a foot force counter to the action of these spiral springs 38, which force leads to a pivot movement of the corresponding pedal 34 or 36 about respective hinge pins 40. The deflection of the particular pedal 34 or 36 out of the zero position thereof, i.e. its current actuation path, is detected by means of a relevant suitable device 42 for electronically capturing the corresponding pedal 34 or 36, it being possible for the devices 42 to comprise for example an optical sensor or a rotary potentiometer.

The signals that are output by the two devices 42 and represent the particular current actuation path are output in a wired or wireless manner to a control unit 44 which determines a travel target value for the industrial truck 10 on the basis of said two current actuation paths, and then outputs this to a controller 46 of a drive motor of the industrial truck 10, in order for this to be operated in a manner corresponding to the actuation of the pedals 34 and 36 by the driver of the industrial truck 10. The industrial truck 10 can comprise an inductive braking unit 48, the control unit 44 of the double pedal system and the inductive braking unit 48 interacting such that, in the event of both pedals being deflected simultaneously, the inductive braking unit 48 is activated.

Figure 3:
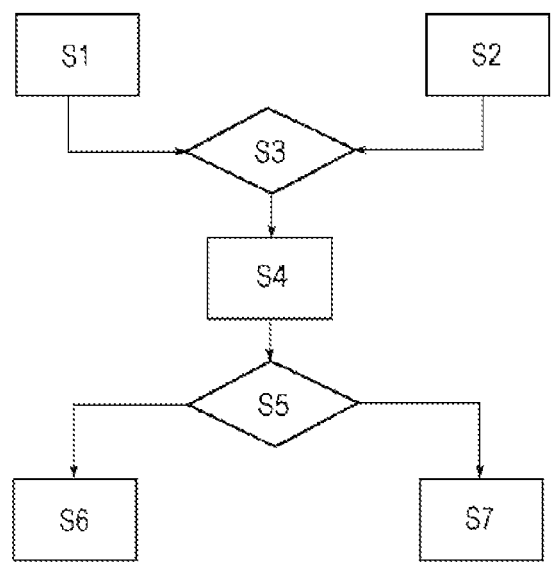
FIG. 3 is a flow diagram of the operating method of the double pedal system of the industrial truck from FIG. 1.
Figure 4:
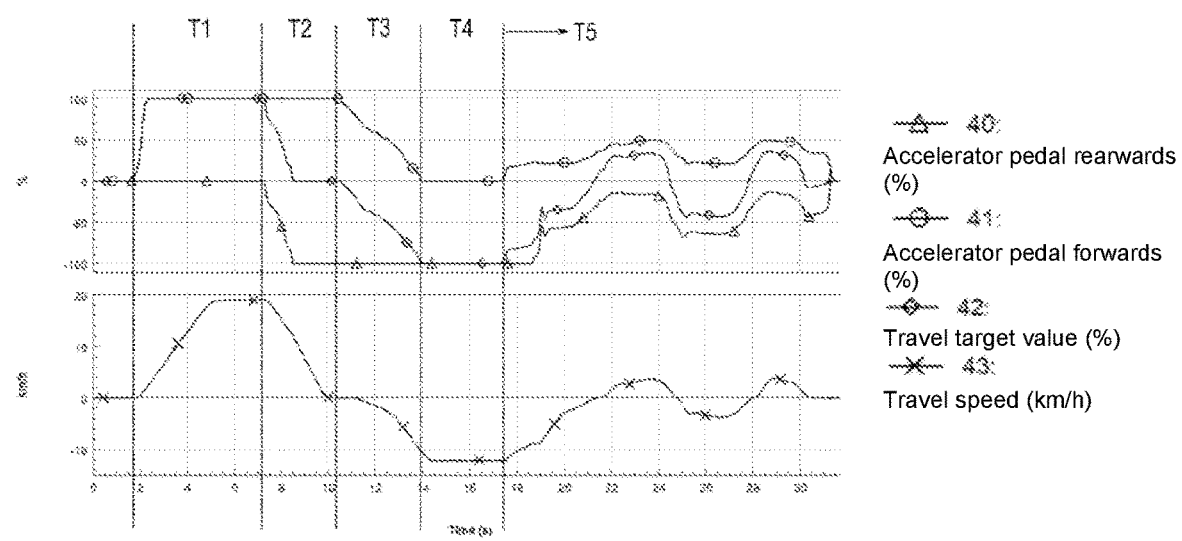
FIG. 4 shows temporal curves which illustrate the operation of the double pedal system of the industrial truck from FIG. 1.

In this case, the flow diagram from FIG. 3 and the temporal curve from FIG. 4 show the functional principle of the operating method which is performed by the control unit 44 discussed above. Firstly, with reference to FIG. 3, as discussed, in steps S1 and S2 the two devices 42 for electronically capturing the current actuation paths of the two pedals 34 and 36 output a captured value in each case, the two captured values being subtracted by the control unit 44 in step S3.

In the present case, in the embodiment a simple subtraction of the two values, without further weighting or dynamic scaling, is intended to take place. In particular, the right-hand pedal 34 should accordingly correspond, in step S1, to a forwards movement, and the left-hand pedal 36 should accordingly correspond, in step S2, to a backwards movement. A case analysis is now carried out for the value S4 calculated in step S3, as to whether said value is greater or smaller than zero. In the event of a result "Yes", said case analysis in step S5 leads to forwards travel, the calculated value of the travel target value from step S4 representing scaling for the maximally available drive power in step S6. In a similar manner, in the event of a determination of "No" in step S5, a backwards travel direction is determined in step S7, the value of the difference from step S3, i.e. the travel target value from S4, representing scaling for a maximum drive power in the rearwards direction.

Finally, with reference to FIG. 4 a travel procedure of the industrial truck 10, given by way of example, from FIG. 1, on the basis of two graphs of temporal curves, the top graph showing the respective current actuation magnitudes of the two pedals 34, 36, and the corresponding travel target value determined as the difference of said two values, while the bottom graph represents the speed curve of the industrial truck 10 over time.

In this case, five time periods T1 to T5 should be considered and described in the following. Furthermore, it is noted that, in the top of the two graphs, the curve having a percentage value of greater than or equal to 0 corresponds to a corresponding deflection of the right-hand pedal 34 corresponding to an instruction for travel in the forwards direction, while the curve having a percentage value of less than or equal to 0 corresponds to a deflection of the left-hand pedal 36 corresponding to an instruction for travel in the rearwards direction.

Thus, in the time period T1 firstly just the right-hand pedal 34 is deflected relatively quickly by its full maximum actuation path, while the left-hand pedal 36 remains unactuated, such that the travel target value increases to 100 percent in a similar manner, analogously to the deflection value of the right-hand pedal 34. Accordingly, a maximum output power is required from the motor of the industrial truck 10 in the forwards direction, leading to an acceleration up to the maximum speed of the vehicle 10 in approximately 5 seconds, and subsequent travel at maximum speed for the remainder of the time period T1. Subsequently, during the time period T2 the right-hand pedal 34 is furthermore kept at its maximum actuation, while in addition the left-hand pedal 36 is actuated successively, until it is fully deflected. Accordingly, the size of the difference of the two actuation paths returns to zero in the same amount as the actuation of the left-hand pedal 36 increases, such that the power required by the drive motor of the industrial truck 10 drops back to zero, and the industrial truck 10 accordingly slows until it comes to a stop. In this case, it is optionally possible for a braking device independent of the drive motor of the industrial truck 10, for example an induction brake, to be connected in addition, in the event of both pedals 34 and 36 being actuated simultaneously.

In the time period T3, the actuation of the right-hand pedal 34 is then successively withdrawn, while the actuation of the left-hand pedal 36 is further retained at 100 percent. Accordingly, the travel target value also reduces successively, to a negative maximum value at the end of the time period T3. Accordingly, the industrial truck 10 begins to travel backwards at an increasing acceleration, as is shown by the speed curve in the time period T3.

The travel target value has then reached a value of minus 100 percent at the start of the time period T4, and in addition the industrial truck 10 has reached its maximum speed in the backwards direction, which is, however, lower than the maximum speed in the forwards direction, as was achieved at the end of the time period T1.

Subsequently, in the time period T5, proceeding from the maximum actuation path of the left-hand pedal 36 present at the end of the time period T4, and the unactuated state of the right-hand pedal 34, sensitive changes of the two actuation paths of the pedals 34 and 36 are shown, which correspond, proceeding from the quick rearwards travel during the time period T4, to typical shunting operation of the industrial truck 10, the simultaneous actuation of the two pedals 34 and 36 making it possible for extremely precise setting of the desired current travel target value, and thus also the

The invention claimed is:

1. A method for operating a double pedal system of an industrial truck, the double pedal system comprising a first spring-reset pedal and a second spring-reset pedal, the method comprising the steps of:
    capturing a current actuation path of the first spring-reset pedal;
    capturing a current actuation path of the second spring-reset pedal; and determining a travel target value from the current actuation path of the first spring-reset pedal and the current actuation path of the second spring-reset pedal, wherein determining the travel target value comprises calculating a difference between the current actuation path of the first spring-reset pedal and the current actuation path of the second spring-reset pedal and scaling the calculated difference with respect to a maximally available drive power of the industrial truck.

2. The method of claim 1, wherein the determination of the travel target value comprises determining a travel target direction.

3. The method of claim 1, wherein a first optical sensor is used for capturing the current actuation path of the first spring-reset pedal; and
a second optical sensor is used for capturing the current actuation path of the second spring-reset pedal.

4. The method of claim 1, wherein a first rotary potentiometer is used for capturing the current actuation path of the first spring-reset pedal; and
a second rotary potentiometer is used for capturing the current actuation path of the second spring-reset pedal.

5. The method of claim 1, wherein determining the travel target value comprises calculating a difference between the current actuation path of the first spring-reset pedal and the current actuation path of the second spring-reset pedal.

6. The method of claim 2, wherein the travel target direction is determined based on the current actuation path of the first spring-reset pedal and the current actuation path of the second spring-reset pedal.

7. The method of claim 1, further comprising ordering a process for reducing a speed value of the industrial truck in an event of both the first spring-reset pedal and the second spring-reset pedal being deflected simultaneously.

8. The method of claim 1, wherein the first spring-reset pedal is provided on a right-hand side with respect to a longitudinal central axis of a driver's seat of the industrial truck, and the second spring-reset pedal is provided on a left-hand side with respect to the longitudinal central axis of the driver's seat.

9. The method of claim 8, wherein the first spring-reset pedal and the second spring-reset pedal are each arranged obliquely with respect to the longitudinal central axis of the driver's seat, such that the first spring-reset pedal and the second spring-reset pedal each extends away from the longitudinal central axis, in a direction away from the driver's seat.

10. The method of claim 1, further comprising, in an event of both the first spring-reset pedal and the second spring-reset pedal being deflected simultaneously, actuating a device for inductive braking.

* * * * *